No. 779,377.

Patented January 3, 1905.

UNITED STATES PATENT OFFICE.

BRUNO RICHARD SEIFERT, OF RADEBEUL, NEAR DRESDEN, AND CURT PHILIPP, OF DRESDEN, GERMANY, ASSIGNORS TO CHEMISCHE FABRIK VON HEYDEN, ACTIENGESELLSCHAFT, OF RADEBEUL, NEAR DRESDEN, GERMANY.

BORNYL ESTERS AND PROCESS OF MAKING CAMPHOR, &c.

SPECIFICATION forming part of Letters Patent No. 779,377, dated January 3, 1905.

Application filed December 9, 1903. Serial No. 184,476. (Specimens.)

*To all whom it may concern:*

Be it known that we, BRUNO RICHARD SEIFERT, a resident of Radebeul, near Dresden, and CURT PHILIPP, a resident of Dresden, in the Kingdom of Saxony, German Empire, subjects of the King of Saxony, have invented new and useful Bornyl Esters and the Process of Making Camphor, Borneol, and Bornyl Esters, of which the following is a specification.

We have found a new class of aromatic compounds called "bornyl esters" of aromatic mono-oxy-carbonic acids. The typical representative of this new class of bodies is the salicylate of borneol, ($C_{10}H_{17}OCOC_6H_4OH$,) and the general formula of this new class is $C_{10}H_{17}OCO-R-OH$, wherein "R" means an aromatic nucleus. The substances of this new class of bodies are especially important on account of their manifold availability. They may be used in the manufacture of borneol and camphor. For this purpose the borneol is separated from the esters by the action of alkalies and oxidized to camphor in the known manner. Furthermore, the substances of this new class of bodies have important therapeutical properties. The salicylate of borneol and the paracresotinate of borneol have an antineuralgic and antirheumatic action when given internally or rubbed into the skin.

We manufacture this new class of compounds by heating aromatic mono-oxy-carbonic acids with terpenes ($C_{10}H_{16}$)—for example, pinene, camphene, mixtures containing pinene and camphene, like turpentine-oil. The chemical reaction takes place according to the equation

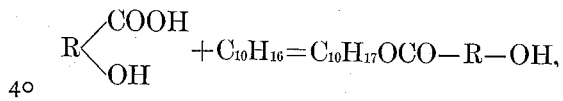

wherein "R" means an aromatic nucleus. The reaction proceeds slowly already at temperatures below 100° centigrade, but can be hastened considerably by higher temperatures.

Example I. A mixture of equal parts of salicylic acid and French turpentine-oil is heated while stirring to 110° centigrade. Within fifty hours this temperature is slowly increased to 130° centigrade. In order to remove the surplus of salicylic acid, the product of the reaction is neutralized with cold soda lye. Intact parts of the turpentine-oil are distilled off by a current of steam. The remaining salicylic ester forms a lightly-colored oil of slight odor and taste, is insoluble in water, difficultly soluble in alcohol, more easily soluble in benzene, ether, chloroform, olive-oil, &c. The alcoholic solution yields a violet color on addition of ferric chlorid. With cold alkali solutions the ester forms solid, but not very constant, salts. If heated with alkaline lye, it is split to salicylic acid and a mixture of terpene alcohols, mainly of the borneol series. On employing French turpentine-oil the mixture principally consists of borneol with a little isoborneol.

Instead of salicylic acid other mono-oxy-carbonic acids of the benzene and naphthalene series and instead of French turpentine-oil other qualities of turpentine or other mixtures containing pinene or camphene may be used. The purer the pinene employed the purer the borneol ester obtained. The purer the camphene employed the purer the isobornyl ester obtained. Condensing means may be added to the mixture of acid and terpene in order to favor the reaction.

Example II. One hundred parts of American turpentine-oil are slowly heated for fifty hours, with one hundred parts of cresotinic acid, to 110° to 130° centigrade. Before heating three parts of boracic acid may be added. The product of the reaction may be worked up according to Example I.

Example III. A mixture of equal parts of salicylic acid, American turpentine-oil, and glacial acetic acid is kept moderately boiling during fifty hours. The product of the reaction is treated with a cold soda solution, and the remaining oil is treated with a current of steam until the rest of the turpentine-oil will be blown out. The remaining salicylic ester may further be purified according to Example I.

Similar experiments have already often been described. For instance, according to the German Letters Patent No. 67,255 (*vide* also *Journal für Praktische Chemie*, neue Folge, Vol. 65, page 223; *Berichte der Deutschen Chemischen Gesellschaft*, XXI, referate 138, and *Annales de Chimie et de Physique*, series 6, Vol. 9, page 518; Vol. 15, page 168; Vol. 16, page 242) terpineol esters of fatty acids, pure or mixed with those of borneol, are obtained by treating terpene with fatty acids in the presence of mineral acids or other condensing means. Bouchardat and Lafont (*Comptes Rendues*, 113, 551) obtained a mixture of the benzoic-acid esters of borneol and of fenchyl alcohol by action of benzoic acid on French turpentine-oil. The United States Letters Patent No. 698,761 states that by heating oxalic acid with turpentine-oil camphor is obtained as main product and borneol-formiate and borneol-oxalate as by-products.

The new class of products obtained by us—the bornyl esters of aromatic mono-oxy-carbonic acids—is characterized by the following properties: The products are oily substances insoluble in water, pretty difficultly soluble in alcohol, more easily soluble in benzene, ether, chloroform, olive-oil, of slight odor and taste, probably colorless when absolutely pure, but retaining a light coloration from the process of manufacture when not quite pure. With cold solutions of caustic alkali the esters form solid salt-like compounds, the hydroxyl hydrogen in the formula $C_{10}H_{17}OCO-R-OH$ being replaced by metal. These salts are inconstant, for when heating the esters with solutions of caustic alkali they are split into a borneol and the alkali salt of an aromatic mono-oxy-carbonic acid. The new esters, as explained above, may be used in the manufacture of borneol and camphor.

Example IV. The salicylic ester which according to Example I remains after removing the surplus of salicylic acid (for instance, by neutralizing the product of the reaction with cold soda-lye) and after distilling off intact parts of the turpentine-oil by a current of steam is heated with a surplus of alkaline lye (for instance, caustic-soda lye) until the ester is split up into salicylic acid and borneols. The alkali salts of salicylic acid are soluble in water. The borneols are insoluble and may therefore be obtained by filtering and washing with water. The remaining borneols may be purified for the production of pure borneol. For the production of camphor purifying is not necessary. The crude borneols are treated with oxidizing means (for instance, nitric acid) and camphor will result. This last-mentioned oxidation of the borneols to camphor has already been described in literature. Therefore a precise explanation of it is not necessary any more.

Having now described our invention and in what manner the same is to be performed, what we claim as new, and desire to secure by Letters Patent, is—

1. Process of manufacturing borneol and camphor by first heating the aromatic mono-oxy-carbonic acids with terpenes, then splitting the bornyl and isobornyl esters of the aromatic mono-oxy-carbonic acids thus obtained by heating those esters with watery solutions of caustic alkalies and finally transforming the obtained borneols into camphor by means of oxidizing agents.

2. Process of manufacturing bornyl esters of aromatic mono-oxy-carbonic acids by heating these acids with terpenes.

3. A new class of bodies, namely the bornyl esters of the aromatic mono-oxy-carbonic acids, characterized by the formula

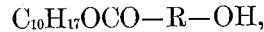

$$C_{10}H_{17}OCO-R-OH,$$

wherein "R" means an aromatic nucleus, and characterized by the following properties: oily substances, insoluble in water, difficultly soluble in alcohol, more easily soluble in benzene, ether, chloroform, olive-oil; of slight odor and taste; decomposing partially when being distilled; yielding alkaline salts on addition of cold caustic alkali lye, the hydroxyl hydrogen in the above formula being replaced by alkali metal; being split by hot caustic alkaline lye into a borneol and an aromatic mono-oxy-carbonic acid.

4. Process of manufacturing borneols by heating terpenes with aromatic mono-oxy-carbonic acids and splitting the resulting esters by treating them with hot alkaline lyes.

In testimony that we claim the foregoing as our invention we have signed our names, in presence of two witnesses, this 25th day of November, 1903.

BRUNO RICHARD SEIFERT.
CURT PHILIPP.

Witnesses:
PAUL E. ADRILING,
PAUL ARRAS.